United States Patent
Gruen et al.

(10) Patent No.: US 10,755,235 B2
(45) Date of Patent: Aug. 25, 2020

(54) MEETING TIME CONSTRAINT FOR A SEQUENCE OF MEETINGS OF A TASK IN A CALENDARING AND SCHEDULING SYSTEM

(75) Inventors: Daniel M. Gruen, Newton, MA (US); Paul B. Moody, Hyde Park, VT (US); Dawei Shen, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 1291 days.

(21) Appl. No.: 13/016,355

(22) Filed: Jan. 28, 2011

(65) Prior Publication Data
US 2012/0198378 A1  Aug. 2, 2012

(51) Int. Cl.
*G06Q 10/10* (2012.01)

(52) U.S. Cl.
CPC .................. *G06Q 10/109* (2013.01)

(58) Field of Classification Search
CPC .............. G06Q 10/06; G06Q 10/109
USPC ......................................... 715/772
See application file for complete search history.

(56) References Cited

U.S. PATENT DOCUMENTS

| 5,046,157 A * | 9/1991 | Smith et al. ............... 340/309.8 |
| 2002/0002558 A1 * | 1/2002 | Krause ................... G06Q 30/02 |
| 2003/0105657 A1 | 6/2003 | Nandigama |
| 2004/0243457 A1 * | 12/2004 | D'Andrea .............. G06Q 10/06 705/7.23 |
| 2005/0033846 A1 * | 2/2005 | Sankaranarayan ....... G06F 9/50 709/226 |
| 2007/0233534 A1 | 10/2007 | Martin |
| 2009/0119126 A1 * | 5/2009 | Johnson ................. G06Q 10/06 705/2 |
| 2010/0106627 A1 | 4/2010 | O'Sullivan |
| 2010/0333028 A1 * | 12/2010 | Welsh et al. ................... 715/833 |
| 2011/0125539 A1 * | 5/2011 | Bollapragada et al. ..... 705/7.12 |

* cited by examiner

*Primary Examiner* — Jennifer N To
*Assistant Examiner* — Ashley M Fortino
(74) *Attorney, Agent, or Firm* — Richard A. Wilhelm

(57) ABSTRACT

Embodiments of the present invention provide a method, system and computer program product for constraining individual meeting times of a task to a specified total duration of aggregated meeting times. In an embodiment of the invention, a method of constraining individual meeting times of a task to a specified total duration of aggregated meeting times is provided. The method includes selecting an event amongst a plurality of events associated with a single task in a C&S system executing in memory of a host server. The method further includes adjusting a duration of time for the selected event. The method yet further includes determining whether or not a sum total of all durations of time for the events associated with the single task exceeds a time constraint for the single task. Thereafter, in response to determining the sum total of all durations of time for the events associated with the single task to have exceeded the time constraint for the single task, a compensatory adjustment of time can be apportioned to remaining ones of the events associated with the single task.

9 Claims, 2 Drawing Sheets

MEETING TIME CONSTRAINT FOR A SEQUENCE OF MEETINGS OF A TASK IN A CALENDARING AND SCHEDULING SYSTEM

BACKGROUND OF THE INVENTION

Field of the Invention

The present invention relates to the field of calendaring and scheduling and more particularly to calendar entry management in a calendaring and scheduling (C&S) system.

Description of the Related Art

Calendaring systems have formed the core component of personal information management software and firmware applications for decades. Initially, a mere calendar display, modern calendaring systems provide scheduling and alarm functions in addition to full integration with contact management, time entry, billing and project management applications. The typical calendaring application minimally provides a mechanism for scheduling an event to occur on a certain date at a certain time. Generally, the event can be associated with a textual description of the event. More advanced implementations also permit the association of the scheduled event with a particular contact, a particular project, or both. Furthermore, most calendar applications provide functionality for setting an alarm prior to the occurrence of the event, as well as archival features.

Several software products include support for Calendaring & Scheduling (C&S). Known C&S products include Lotus™ Notes™, Microsoft™ Outlook™, and web-based products like Yahoo!™ Calendar™. These products allow one to manage personal events including appointments and anniversaries. C&S products also typically allow one to manage shared events, referred to generally as meetings. Electronic C&S software allows a group of people to negotiate around the scheduling of a proposed event such as a meeting, with the goal of selecting a time that allows most of the group to attend.

Of note, generally two types of events can be scheduled in a C&S system: a stand-alone event and a repeating event. In the former circumstance, the event is set for a single date and time range, while in the latter circumstance, the event is set to repeat at specified intervals for a duration of time. Further, in the latter circumstance a change to the event can be applied onto for a selected instance of the repeating event, or for all instances. In this regard, a change in duration of a selected instance of the repeating event can be applied only to the selected instance of the repeating event, or to all repeating events. However, when a change is applied only to a selected instance of the repeating event, no other changes are applied to other instances of the repeating event in consequence of the change to the selected instance of the repeating event.

Advanced forms of the C&S system provide for the aggregation of different events for a single task or activity. In this regard, multiple different events can be associated with a single task, such as a sequence of meetings over a course of days or even weeks. Yet, unless the meetings of a single task are grouped together as a repeating event, changes to one of the meetings will not impact others of the meetings of the single task. Conversely, if the meetings of the single task are grouped together as a repeating event, a change to one of the meetings can only be applied individually, or to the entire sequence of meetings uniformly.

BRIEF SUMMARY OF THE INVENTION

Embodiments of the present invention address deficiencies of the art in respect to calendaring a sequence of events for a single task and provide a novel and non-obvious method, system and computer program product for constraining individual meeting times of a task to a specified total duration of aggregated meeting times. In an embodiment of the invention, a method of constraining individual meeting times of a task to a specified total duration of aggregated meeting times is provided. The method includes selecting an event amongst a plurality of events associated with a single task in a C&S system executing in memory of a host server. The method further includes adjusting a duration of time for the selected event. The method yet further includes determining whether or not a sum total of all durations of time for the events associated with the single task exceeds a time constraint for the single task. Thereafter, in response to determining the sum total of all durations of time for the events associated with the single task to have exceeded the time constraint for the single task, a compensatory adjustment of time can be apportioned to remaining ones of the events associated with the single task.

In another embodiment of the invention, a C&S data processing system is provided. The system includes a host server with at least one processor and memory configured for communicative coupling to different computers over a computer communications network. The system also includes a C&S system executing in the memory of the host server. Different events can be scheduled in the C&S system and associated with a single task in the C&S system. Finally, a time constraint enforcement module can be coupled to the C&S system. The module can include program code enabled to select an event amongst the events, and to respond to an adjustment of a duration of time for the selected event by determining whether or not a sum total of all durations of time for the events associated with the single task exceeds a time constraint for the single task and by apportioning a compensatory adjustment of time to remaining ones of the events associated with the single task in response to determining the sum total of all durations of time for the events associated with the single task to have exceeded the time constraint for the single task.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for constraining individual meeting times of a task to a specified total duration of aggregated meeting times. In accordance with an embodiment of the invention, different events in a C&S system can be associated with a single task. A time constraint further can be established for a sum of different durations of time established for all of the events. Thereafter, a duration of time established for a selected one of the events for the single task can change. Based upon the change, the duration of time established for each of the others of the events for the single task can be adjusted such that the sum total of all time scheduled for the events for the single task does not breach the time constraint. In this regard, the adjustment to a duration of time set for each of the others of the events for the single task to ensure non-breach of the time constraint can be apportioned evenly to the others of the events, or proportionately according to a weighting factor determined for each of the others of the events.

Figure 1:
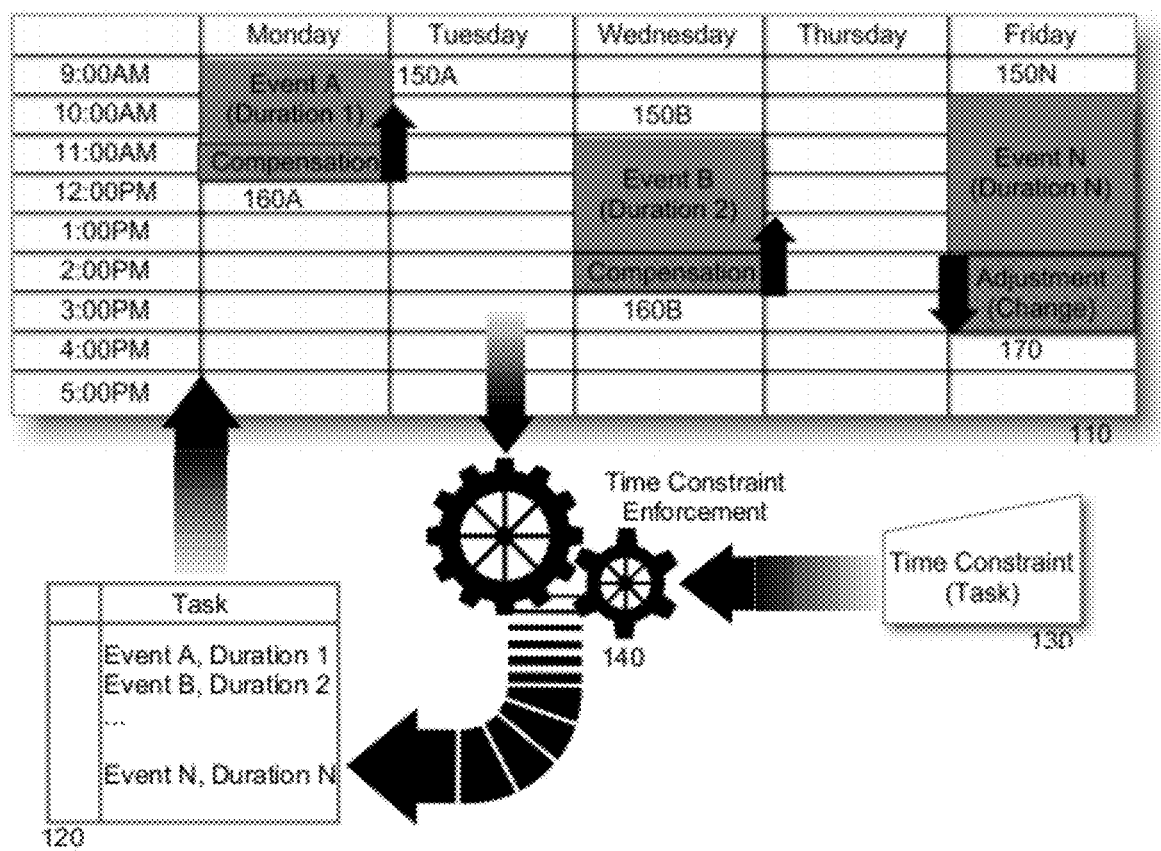
FIG. 1 is a pictorial illustration of a process for constraining individual meeting times of a task to a specified total duration of aggregated meeting times.

In further illustration, FIG. 1 pictorially shows a process for constraining individual meeting times of a task to a specified total duration of aggregated meeting times. As shown in FIG. 1, different events 150A, 150B, 150N can be associated with a single task 120, each of the events 150A, 150B, 150N being assigned a duration of time. A time constraint 130 further can be established for the events 150A, 150B, 150N of the single task 120. The time constraint 130 can specify a total duration of time available for the sum of all durations of time for the events 150A, 150B, 150N. Thereafter, time constraint enforcement logic 140 can respond to a change in a duration of time 170 for the event 150N by determining whether or not the change in the duration of time 170 for the event 150N causes the sum total of all durations of time for the events 150A, 150B, 150N to exceed the time constraint 130. If so, the time constraint logic 140 can reduce the durations of time 160A, 160B for the remaining events 150A, 150B of the single task 120 to compensate for the change in the duration of time 170 for the event 150N.

Figure 2:
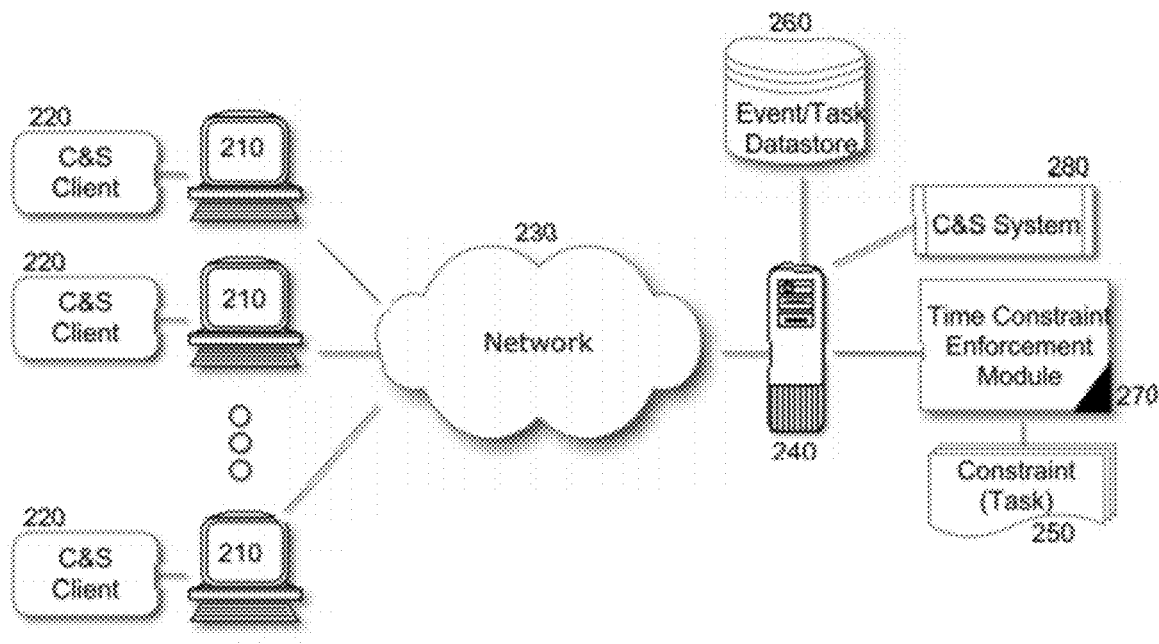
FIG. 2 is a schematic illustration of a C&S data processing system configured for constraining individual meeting times of a task to a specified total duration of aggregated meeting times; and, FIG. 3 is a flow chart illustrating a process for constraining individual meeting times of a task to a specified total duration of aggregated meeting times.

The process described in connection with FIG. 1 can be implemented in a C&S data processing system. In further illustration, FIG. 2 is a schematic illustration of a C&S data processing system configured for constraining individual meeting times of a task to a specified total duration of aggregated meeting times. The system can include a host server 240 with at least one processor and memory configured for coupling to multiple different computers 210 over a computer communications network 230. The host server 240 can support the execution of a C&S system 280 scheduling different events for a single task in an event/task data store 260 accessible by different users through respectively different C&S clients 220 executing in corresponding ones of the computers 210.

Notably, time constraint enforcement module 270 can execute in the memory of the host server 240. The time constraint enforcement module 270 can include program code that when executed in the host server 240 can respond to a change in a duration of time for an event amongst a set of events for a single task in the data store 260 by determining whether a total duration of time for all events of the single task exceed a time constraint 250 for the single task. If so, the program code of the time constraint enforcement module 270 can reduce the durations of time established for remaining ones of the events for the single task to ensure compliance with the time constraint 250 for the single task.

Figure 3:
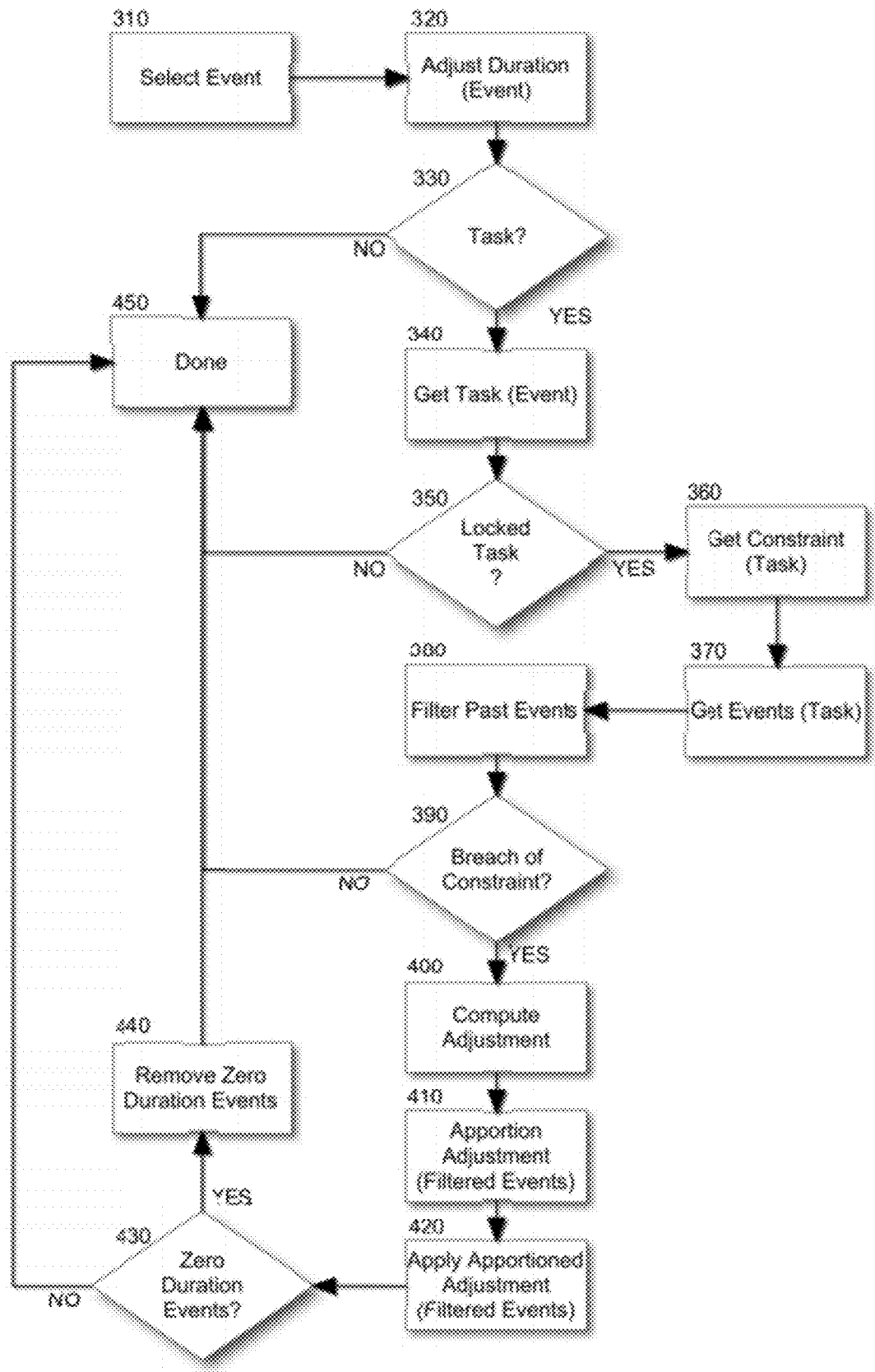

In even yet further illustration of the operation of the time constraint enforcement module 270, FIG. 3 is a flow chart illustrating a process for constraining individual meeting times of a task to a specified total duration of aggregated meeting times. Beginning in block 310, an event can be selected in a C&S system. In block 320, a duration of time for the selected event can be adjusted, either by expanding or reducing the duration of time. In decision block 330, it can be determined whether or not the selected event has been associated with a single task along with at least one other event. If not, the process can end in block 450. Otherwise, the process can continue through block 340.

In block 340, a single task for the selected event can be retrieved and in decision block 350, it can be determined whether or not the single task has been locked in association with a time constraint. If so, in block 360 the time constraint for the single task can be retrieved and the remaining events for the single task also can be retrieved. In block 380, events scheduled for a period of time and date already past can be filtered from the events of the single task. Thereafter, in decision block 390 it can be determined whether or not the adjustment to the duration of time for the selected event causes the sum total of all durations of time for the filtered events of the single task to exceed the time constraint. If not, the process can end in block 450. Otherwise, the process can continue through block 400.

In block 400, an adjustment to the durations of time corresponding to the remaining events in the filtered set of events can be computed to reduce the sum total of all durations of time for the filtered events of the single task to the time constraint for the single task. Once computed, in block 410 the adjustment can be apportioned amongst the remaining events in the filtered set of events, whether evenly or proportionately according to weighted values of the remaining events in the filtered set. Subsequently, in block 420 the apportionments can be applied to the remaining events in the filtered set of events. In decision block 430, if any of the remaining events correspond to an established duration of time of zero in consequence of the applied apportionments, those remaining events can be removed from the C&S system in block 440. Finally, the process can end in block 450.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of constraining individual meeting times of a task to a specified total duration of aggregated meeting times comprising:

specifying a time constraint for a single task that includes a multiplicity of different events, wherein the time constraint is a total duration of time available for the single task including the multiplicity of events;

subsequent to specifying the time constraint, specifying a duration of time for each of the events, wherein the sum of duration of times is constrained to be less than or equal to the time constraint;

selecting one of the events not yet having occurred in the single task;

adjusting a duration of time for the selected one of the events;

determining that a sum total of all durations of time for the events associated with the single task including the adjusted duration of time for the selected one of the events exceeds the time constraint; and, responding to the determination by computing a compensatory adjustment of time necessary to reduce the sum total of all durations to not exceed the time constraint, identifying a subset of the events yet to occur, apportioning the compensatory adjustment of time to each one of the events in the subset so as to reduce a duration of time for each of the events in the subset, and removing from the subset at least one of the events in the subset having a duration of time of zero resulting from the apportionment, in order to produce a modified task of a reduced number of events with ones of the events remaining in the subset each having a reduced duration of time.

2. The method of claim 1, wherein the compensatory adjustment comprises an even compensatory adjustment of time across all events in the subset.

3. The method of claim 1, wherein the compensatory adjustment comprises a proportionate compensatory adjustment of time by weight across all events in the subset.

4. A calendaring and scheduling (C&S) data processing system comprising:

a host server with at least one processor and memory configured for communicative coupling to a plurality of different computers over a computer communications network;

a C&S system executing in the memory of the host server;

a plurality of events scheduled in the C&S system and associated with a single task in the C&S system; and, a time constraint enforcement module coupled to the C&S system, the module comprising program code enabled to perform:

specifying a time constraint for a single task that includes a multiplicity of different events, wherein the time constraint is a total duration of time available for the single task including the multiplicity of events;

subsequent to specifying the time constraint, specifying a duration of time for each of the events, wherein the sum of duration of times is constrained to be less than or equal to the time constraint;

selecting one of the events not yet having occurred in the single task;

adjusting a duration of time for the selected one of the events;

determining that a sum total of all durations of time for the events associated with the single task including the adjusted duration of time for the selected one of the events exceeds the time constraint; and, responding to the determination by computing a compensatory adjustment of time necessary to reduce the sum total of all durations to not exceed the time constraint, identifying a subset of the events yet to occur, apportioning the compensatory adjustment of time to each one of the events in the subset so as to reduce a duration of time for each of the events in the subset, and removing from the subset at least one of the events in the subset having a duration of time of zero resulting from the apportionment, in order to produce a modified task of a reduced number of events with ones of the events remaining in the subset each having a reduced duration of time.

5. The system of claim 4, wherein the apportionment of the compensatory adjustment of time is an even apportionment across the remaining ones of the events.

6. The system of claim 4, wherein the apportionment of the compensatory adjustment of time is a proportional apportionment across the remaining ones of the events.

7. A computer program product for constraining individual meeting times of a task to a specified total duration of aggregated meeting times, the computer program product comprising:

a computer readable storage memory device having computer readable program code embodied therewith, the computer readable program code comprising:

computer readable program code for specifying a time constraint for a single task that includes a multiplicity of different events, wherein the time constraint is a total duration of time available for the single task including the multiplicity of events;

computer readable program code for subsequent to specifying the time constraint, specifying a duration of time for each of the events, wherein the sum of duration of times is constrained to be less than or equal to the time constraint;

computer readable program code for selecting one of the events not yet having occurred in the single task;

computer readable program code for adjusting a duration of time for the selected one of the events;

computer readable program code for determining that a sum total of all durations of time for the events associated with the single task including the adjusted duration of time for the selected one of the events exceeds the time constraint; and, computer readable program code for responding to the determination by computing a compensatory adjustment of time necessary to reduce the sum total of all durations to not exceed the time constraint, identifying a subset of the events yet to occur, apportioning the compensatory adjustment of time to each one of the events in the subset so as to reduce a duration of time for each of the events in the subset, and removing from the subset at least one of the events in the subset having a duration of time of zero resulting from the apportionment, in order to produce a modified task of a reduced number of events with ones of the events remaining in the subset each having a reduced duration of time.

8. The computer program product of claim 7, wherein the compensatory adjustment comprises an even compensatory adjustment of time across all events in the subset.

9. The computer program product of claim 7, wherein the compensatory adjustment comprises a proportionate compensatory adjustment of time by weight across all events in the subset.

* * * * *